(12) United States Patent
Itoh

(10) Patent No.: US 6,924,939 B2
(45) Date of Patent: Aug. 2, 2005

(54) ZOOM LENS SYSTEM, AND IMAGE PICK-UP APPARATUS INCORPORATING SUCH ZOOM LENS SYSTEM

(75) Inventor: Yoshinori Itoh, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/643,550

(22) Filed: Aug. 19, 2003

(65) Prior Publication Data

US 2004/0051961 A1 Mar. 18, 2004

(30) Foreign Application Priority Data

Aug. 19, 2002 (JP) ........................................ 2002-238099

(51) Int. Cl.⁷ .............................................. G02B 15/14
(52) U.S. Cl. ...................................... 359/689; 359/686
(58) Field of Search ................................. 359/686, 689

(56) References Cited

U.S. PATENT DOCUMENTS

| | | | | |
|---|---|---|---|---|
| 4,662,723 A | | 5/1987 | Imai ........................... | 359/680 |
| 4,687,302 A | | 8/1987 | Ikemori et al. ............. | 359/686 |
| 4,733,952 A | | 3/1988 | Fujioka ...................... | 359/681 |
| 4,802,747 A | | 2/1989 | Horiuchi ..................... | 359/667 |
| 5,434,710 A | | 7/1995 | Zozawa ...................... | 359/689 |
| 5,872,660 A | | 2/1999 | Kohno et al. .............. | 359/689 |
| 5,978,154 A | | 11/1999 | Hashimura .................. | 359/691 |
| 6,038,084 A | | 3/2000 | Okada et al. ............... | 359/689 |
| 6,191,896 B1 | | 2/2001 | Itoh ............................ | 359/689 |
| 6,308,011 B1 | | 10/2001 | Wachi et al. ................. | 396/72 |
| 6,351,337 B1 | * | 2/2002 | Tanaka ....................... | 359/684 |
| 6,417,973 B2 | * | 7/2002 | Mihara et al. .............. | 359/684 |
| 6,498,687 B1 | | 12/2002 | Sekita et al. ................ | 389/680 |
| 6,545,819 B1 | * | 4/2003 | Nanba et al. ............... | 359/689 |
| 6,597,513 B2 | * | 7/2003 | Minefuji ..................... | 359/689 |

FOREIGN PATENT DOCUMENTS

| | | |
|---|---|---|
| JP | 60-31110 | 2/1985 |
| JP | 63-81313 | 4/1988 |
| JP | 3-296706 | 12/1991 |
| JP | 5-323190 | 12/1993 |
| JP | 7-52256 | 2/1995 |
| JP | 9-21950 | 1/1997 |
| JP | 10-3037 | 1/1998 |
| JP | 10-104520 | 4/1998 |
| JP | 10-206732 | 8/1998 |
| JP | 11-84242 | 3/1999 |
| JP | 2000-19392 | 1/2000 |
| JP | 2000-89110 | 3/2000 |
| JP | 2000-275520 | 10/2000 |
| JP | 2001-272602 | 10/2001 |

* cited by examiner

*Primary Examiner*—Georgia Epps
*Assistant Examiner*—William Choi
(74) *Attorney, Agent, or Firm*—Morgan & Finnegan, LLP

(57) ABSTRACT

Disclosed is a zoom lens system which includes, in order from the object side to the image side, a first lens unit having negative optical power, a second lens unit having positive optical power, and a third lens unit having positive optical power. During the zooming operation of the zoom lens system, a distance between the first lens unit and the second lens unit is smaller at the telephoto end than at the wide-angle end, and a distance between the second lens unit and the third lens unit is changed. During the zooming operation of the zoom lens system from the wide-angle end to the telephoto end, the second lens unit moves toward the object side. Three lens elements constitute the second lens unit, and the location of its aspherical surface is appropriately set to achieve excellent remarkable performance.

20 Claims, 13 Drawing Sheets

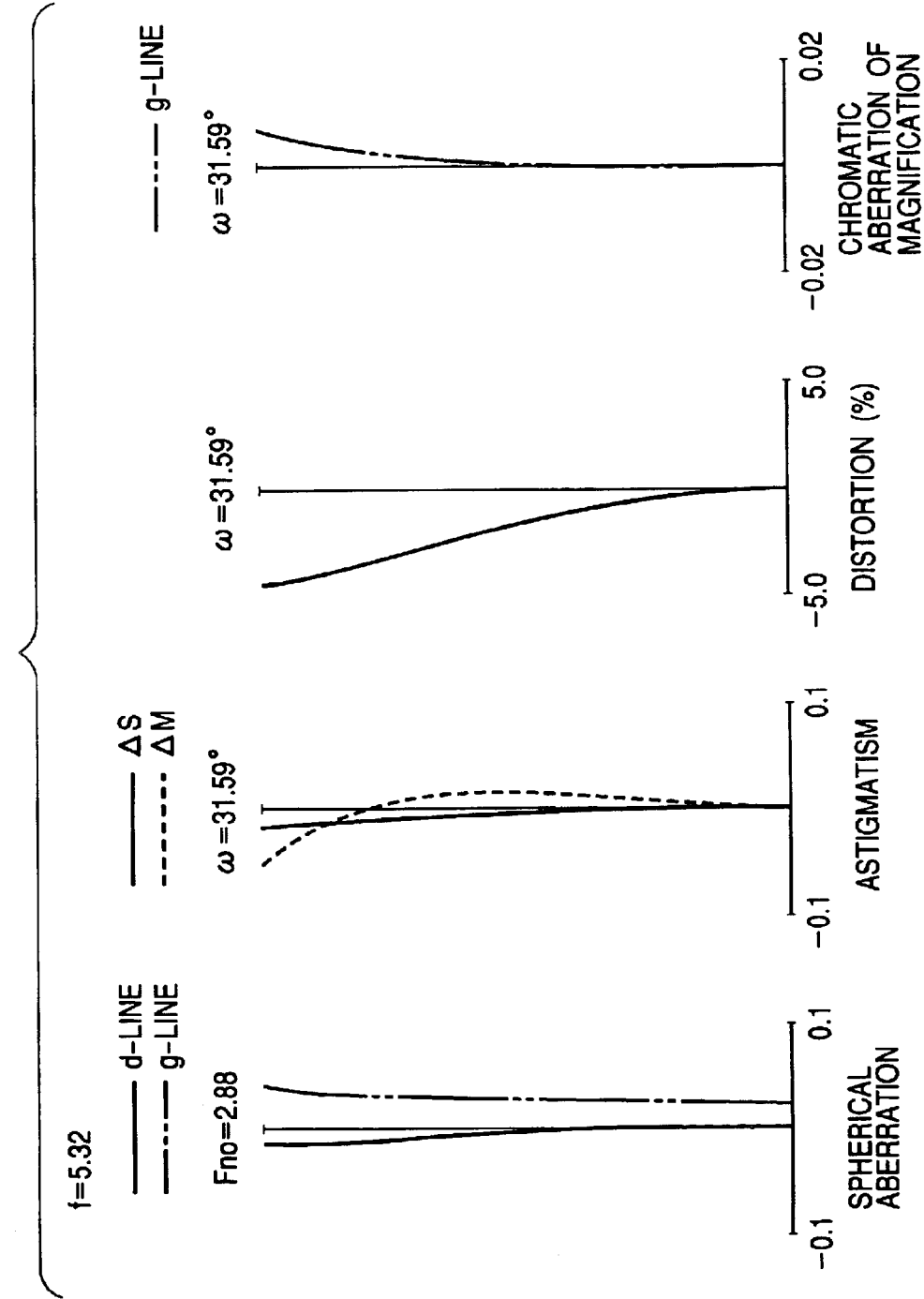

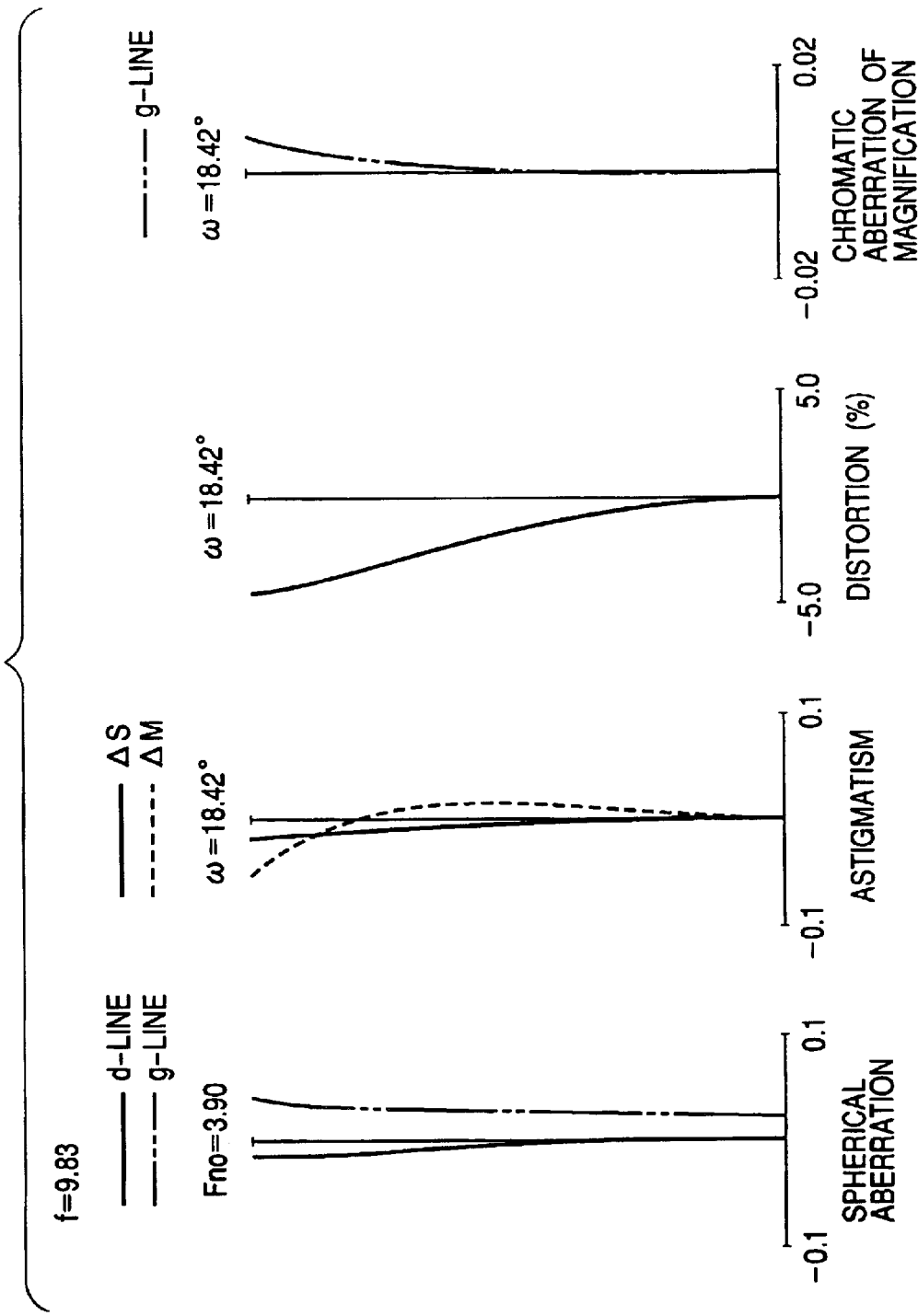

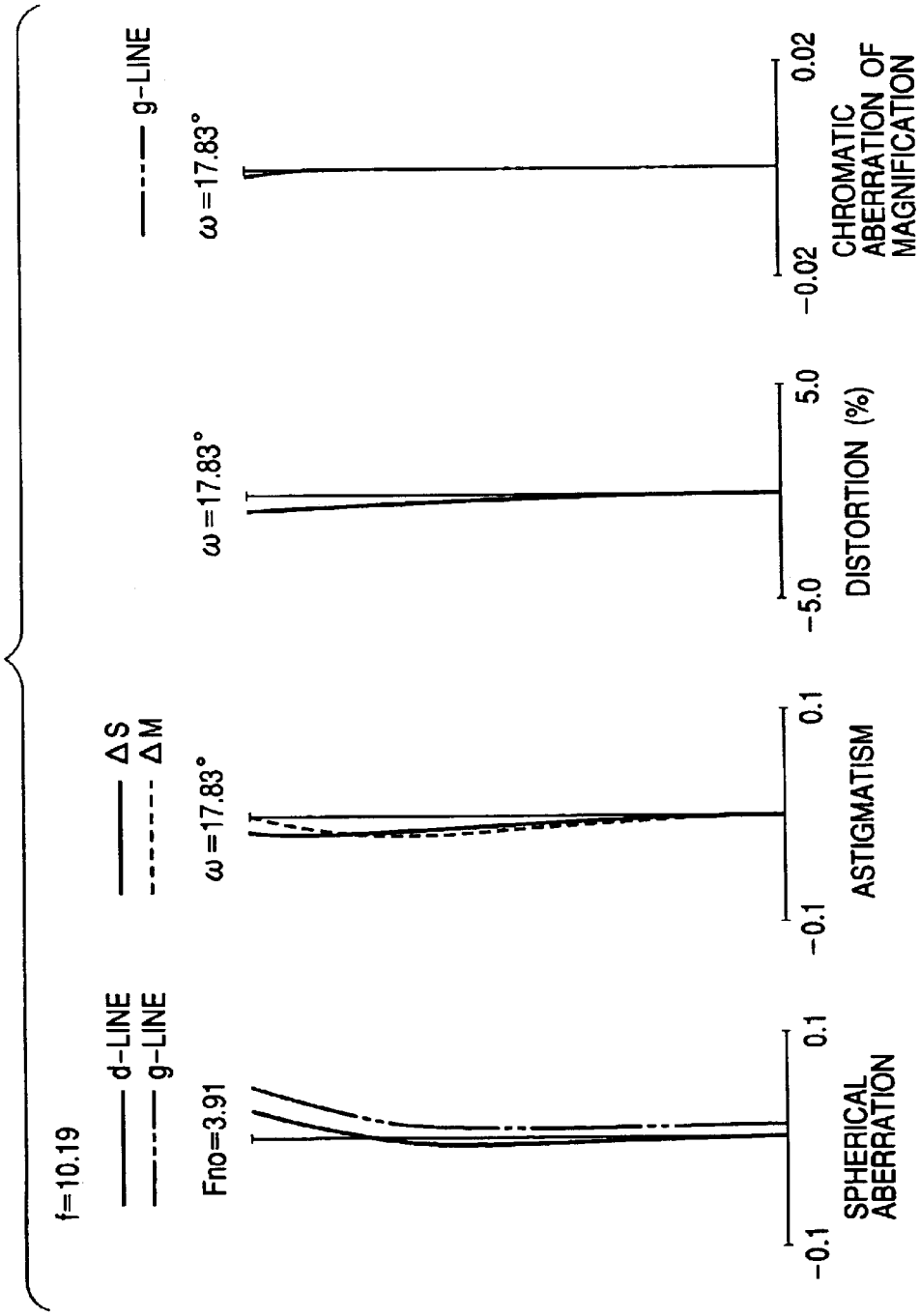

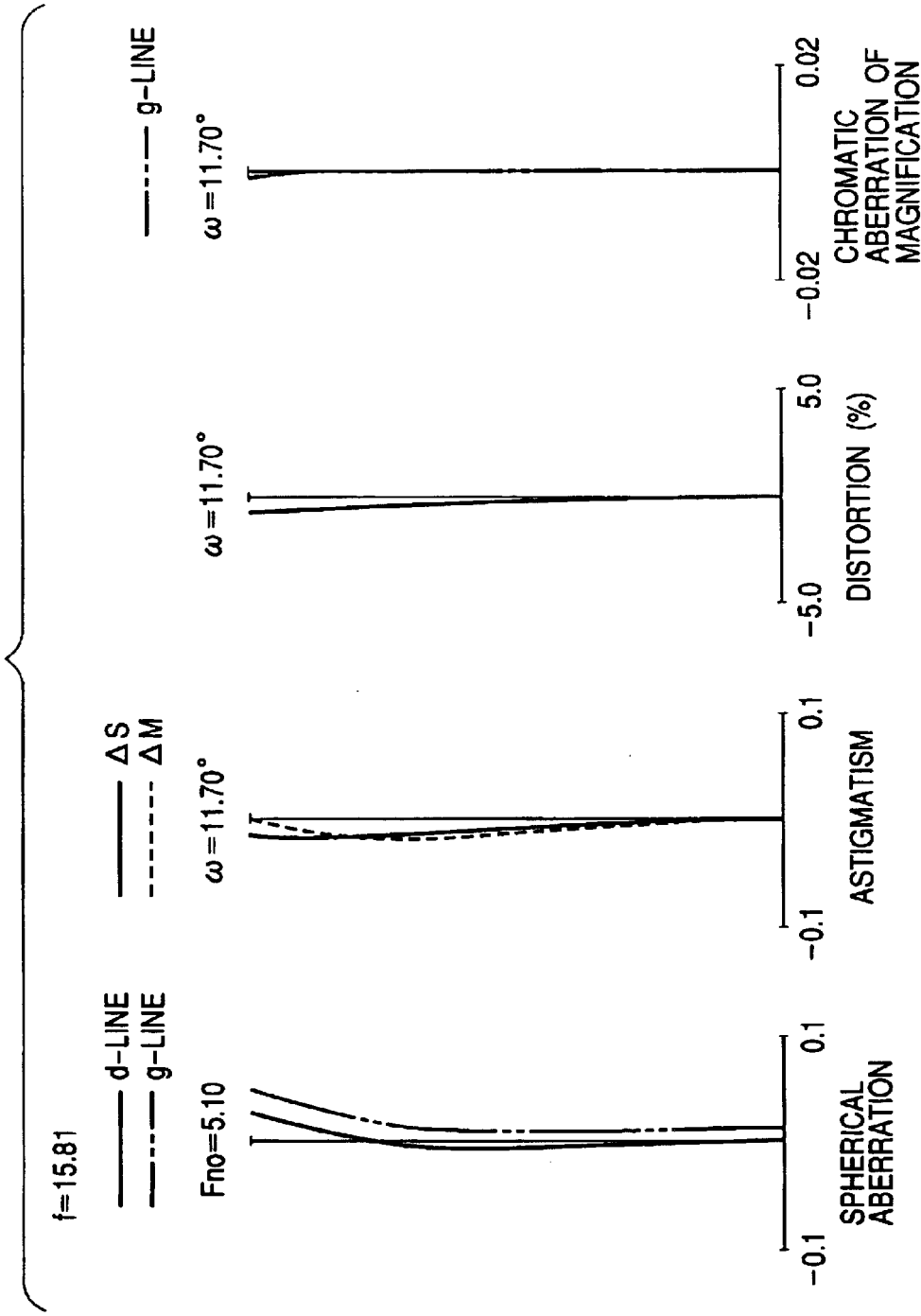

ZOOM LENS SYSTEM, AND IMAGE PICK-UP APPARATUS INCORPORATING SUCH ZOOM LENS SYSTEM

BACKGROUND OF THE INVENTION

1. Field of the Invention

The present invention relates to a zoom lens system, and particularly to a zoom lens system preferably usable in image pick-up apparatuses, such as a digital still camera, and a video camera.

2. Related Background Art

In recent cameras using solid-state image pick-up devices of CCD sensors, CMOS sensors, or the like, such as a video camera, a digital camera, and an electronic still camera, performance has been enhanced. In conformity therewith, high optical performance and reduced size are both required for optical systems used therein.

Generally, as a zoom lens used in image pick-up apparatuses using solid-state image pick-up devices, such as a video camera, often used is a lens type including three to five lens units, in which a lens unit disposed on the side closest to an object remains stationary during zooming operation, and which begins with lens units having positive, negative and positive refractive powers.

For example, Japanese Patent Application Laid-Open No. 63-81313 (its U.S. counterpart is U.S. Pat. No. 4,802,747) discloses a zoom lens which includes four lens units having positive, negative, positive and positive refractive powers, and has a variable power ratio of about three. Further, Japanese Patent Application Laid-Open No. 3-296706 discloses as a zoom lens with a higher variable power ratio a zoom lens which includes four lens units having positive, negative, positive and positive refractive powers, and has a variable power ratio of about ten.

On the other hand, as a zoom lens usable in a digital still camera for photo-taking a still picture image using a solid-state pick-up device, it is desired to obtain an optical system which has an extremely short total lens length, and has a wide angle of view in the light of characteristics of the still picture, and optical performance higher than that of a zoom lens used in a video camera for taking a dynamic picture image.

Japanese Patent Publication No. 6-66008 (its U.S. counterpart is U.S. Pat. No. 4,662,723), and so forth disclose a zoom lens which includes two lens units having negative and positive refractive powers, and performs zooming by changing air gaps between lens units, as a lens which contains a wide-angle range, is bright, and achieves high performance though its variable power ratio is relatively low, say about 2.5 to 3.

Japanese Patent Publication No. 7-52256 (its U.S. counterpart is U.S. Pat. No. 4,733,952) discloses a zoom lens which includes three lens units having negative, positive and positive refractive powers, and in which a distance between a second lens unit and a third lens unit is widened during zooming operation from its wide-angle end to its telephoto end.

U.S. Pat. No. 5,434,710 discloses a zoom lens which includes three lens units having negative, positive and positive refractive powers, and in which a distance between a second lens unit and a third lens unit is narrowed during zooming operation from its wide-angle end to its telephoto end.

Japanese Patent Application Laid-Open No. 60-31110 (its U.S. counterpart is U.S. Pat. No. 4,687,302) discloses a zoom lens which includes four lens units having negative, positive, positive and positive refractive powers, and in which a distance between a second lens unit and a third lens unit is narrowed during zooming operation from its wide angle end to its telephoto end, and a fourth lens unit remains stationary during zooming.

Japanese Patent Application Laid-Open No. 10-104520 discloses a zoom lens which includes four lens units having negative, positive, positive and positive refractive powers.

Japanese Patent Application Laid-Open No. 11-84242 (its U.S. counterpart is U.S. Pat. No. 6,191,896) discloses a compact zoom lens which includes four lens units having negative, positive, positive and positive refractive powers, and has a variable power ratio of about three, and in which variation in its exit pupil is relatively small during zooming operation.

U.S. Pat. Nos. 5,872,660 and 6,038,084, Japanese Patent Application Laid-Open Nos. 5-323190, 9-21950, 10-3037 (its U.S. counterpart is U.S. Pat. No. 5,978,154), Japanese Patent Application Laid-Open Nos. 10-206732, 2000-19392 and 2000-89110 (its U.S. counterpart is U.S. Pat. No. 6,308,011), Japanese Patent Application Laid-Open Nos. 2000-275520, 2001-272602 (its U.S. counterpart is U.S. Pat. No. 6,498,687), and so forth disclose a zoom lens which includes lens units having negative, positive and positive refractive powers in the order from the object side, and in which the second lens unit has two aspherical surfaces.

In recent solid-state image pick-up devices, the number of pixels is being increasing, and in conformity therewith a photo-taking lens having higher optical performance is required, as compared with conventional ones.

Generally, in a zoom lens of a negative lead type, where arrangement of refractive powers in respective lens units, and lens constructions and aspherical surfaces of respective lens units are employed, there is a need of appropriately setting a surface on which the aspherical surface is to be formed, and so forth, in order to obtain preferable optical performance over the overall variable power range while reducing the number of lenses in the entire lens system, simplifying the lens construction, and increasing the angle of view.

If the arrangement of refractive powers in respective lens units, lens construction, and selection of places of aspherical surfaces are inappropriate, the effect of the aspherical surface is likely to decrease, and variation in aberrations occurring during zooming operation is liable to increase. Therefore, it is difficult to obtain high optical performance over the overall zoom range.

SUMMARY OF THE INVENTION

It is an object of the present invention to provide a compact zoom lens in which the number of constituent lenses is small, and which has remarkable optical performance.

In one aspect, a zoom lens system of the present invention includes, in order from the object side (a forward side) thereof to the image side (a rearward side) thereof, a first lens unit having negative optical power, a second lens unit having positive optical power, and a third lens unit having positive optical power. During zooming operation of the zoom lens system, a distance between the first lens unit and the second lens unit is smaller at the telephoto end than at the wide-angle end, and a distance between the second lens unit and the third lens unit is changed. Further, during zooming operation of the zoom lens system from the wide-angle end to the telephoto end, the second lens unit moves toward the object side.

The second lens unit is comprised of three lens elements, and the position of its aspherical surface is appropriately set so that the above-noted object can be achieved.

These and further aspects and features of the invention will become apparent from the following detailed description of preferred embodiments thereof in conjunction with the accompanying drawings.

BRIEF DESCRIPTION OF THE DRAWINGS

FIG. 2 is a view illustrating aberration charts of the first embodiment at its wide-angle end;

FIG. 3 is a view illustrating aberration charts of the first embodiment at its intermediate zoom point;

FIG. 11 is a view illustrating aberration charts of the third embodiment at its intermediate zoom point;

FIG. 12 is a view illustrating aberration charts of the third embodiment at its telephoto end.

DESCRIPTION OF THE PREFERRED EMBODIMENTS

Embodiments of a zoom lens system and an image pick-up apparatus using the zoom lens system of the present invention will hereinafter be described with reference to the drawings.

Figure 1A:
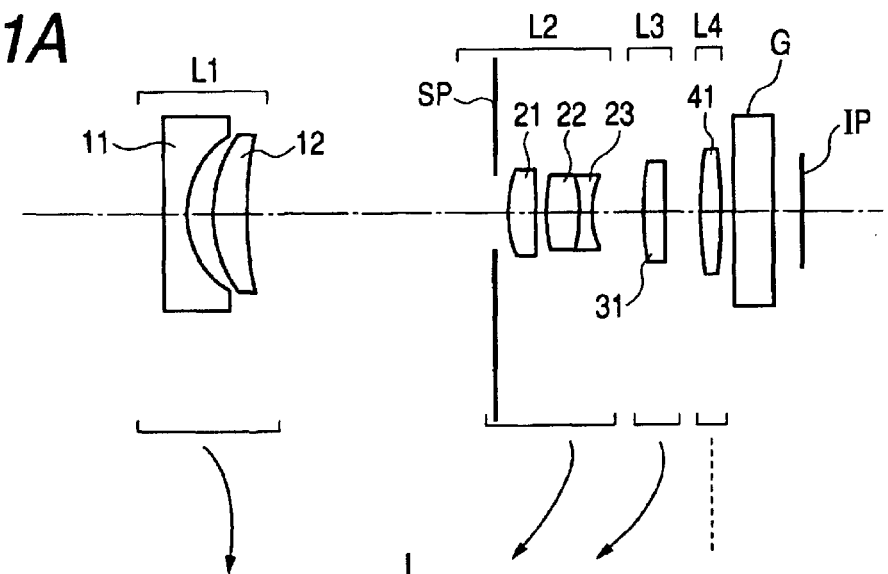
FIGS. 1A, 1B and 1C are cross-sectional views illustrating a zoom lens of a first embodiment according to the present invention.
Figure 1B:
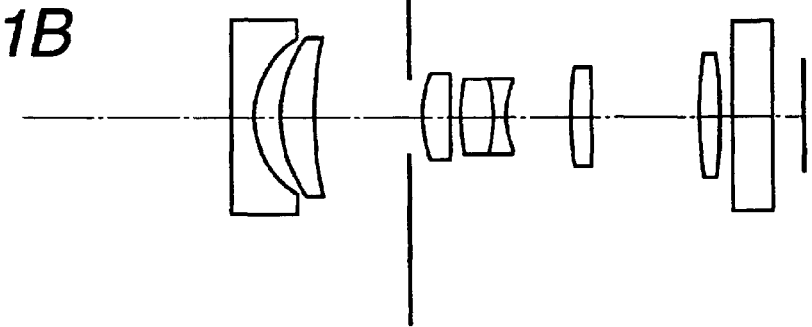
Figure 1C:
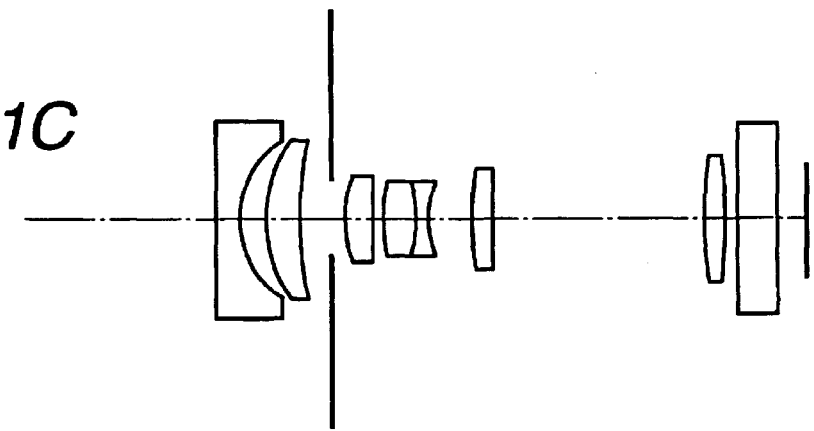
Figure 4:
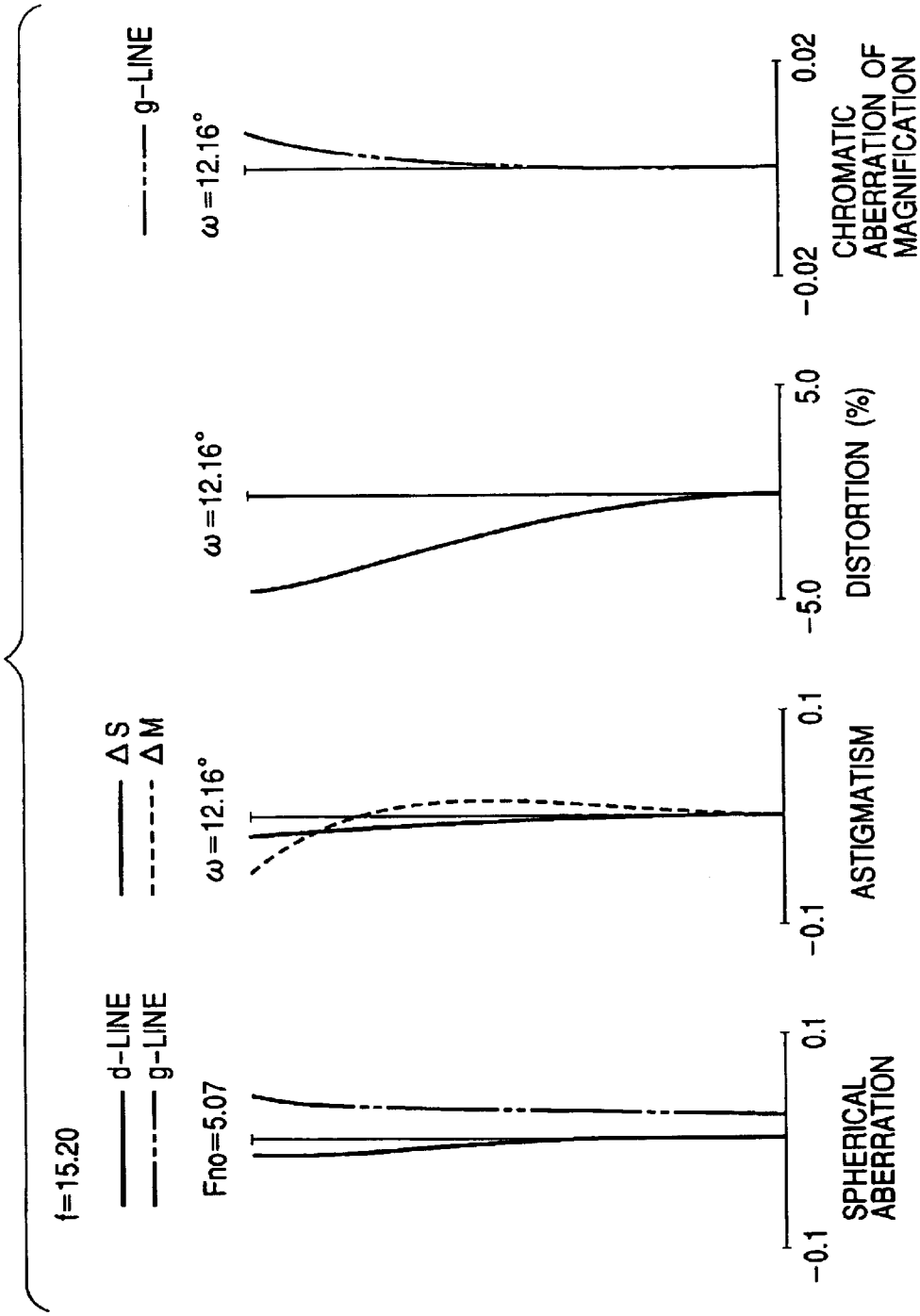
FIG. 4 is a view illustrating aberration charts of the first embodiment at its telephoto end.

FIGS. 1A to 1C are cross-sectional views illustrating a zoom lens of a first embodiment according to the present invention, and FIGS. 2 to 4 are views illustrating aberration charts of the first embodiment at its wide-angle end, at its intermediate zoom point, and at its telephoto end, respectively.

Figure 5A:
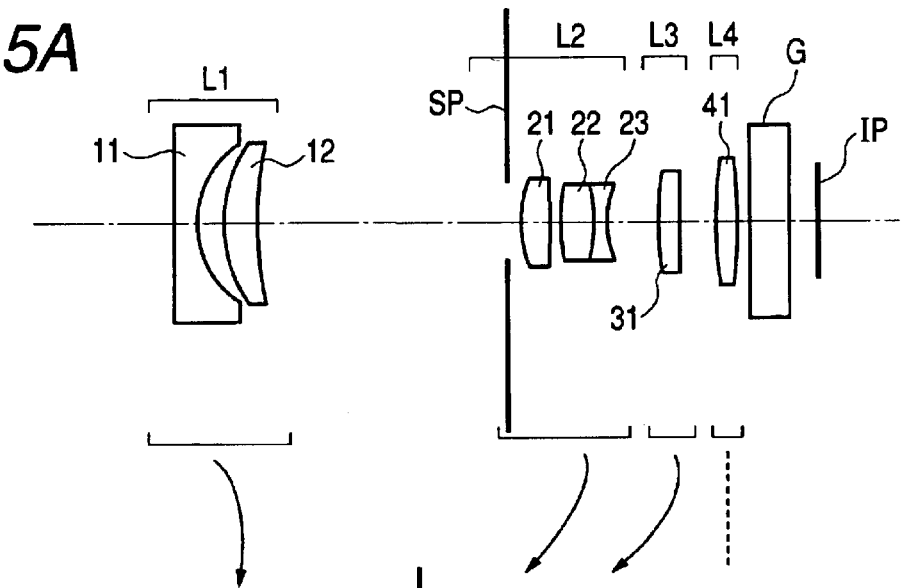
FIGS. 5A, 5B and 5C are cross-sectional views illustrating a zoom lens of a second embodiment according to the present invention.
Figure 5B:
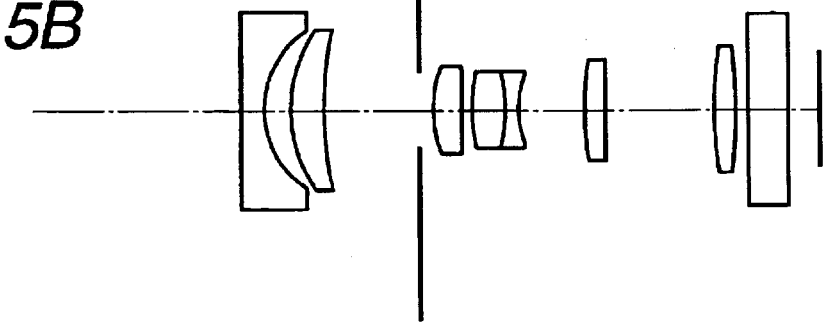
Figure 5C:
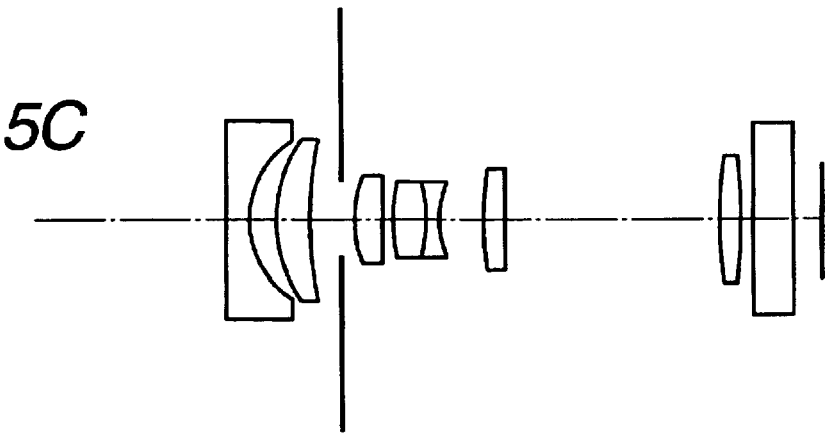
Figure 6:
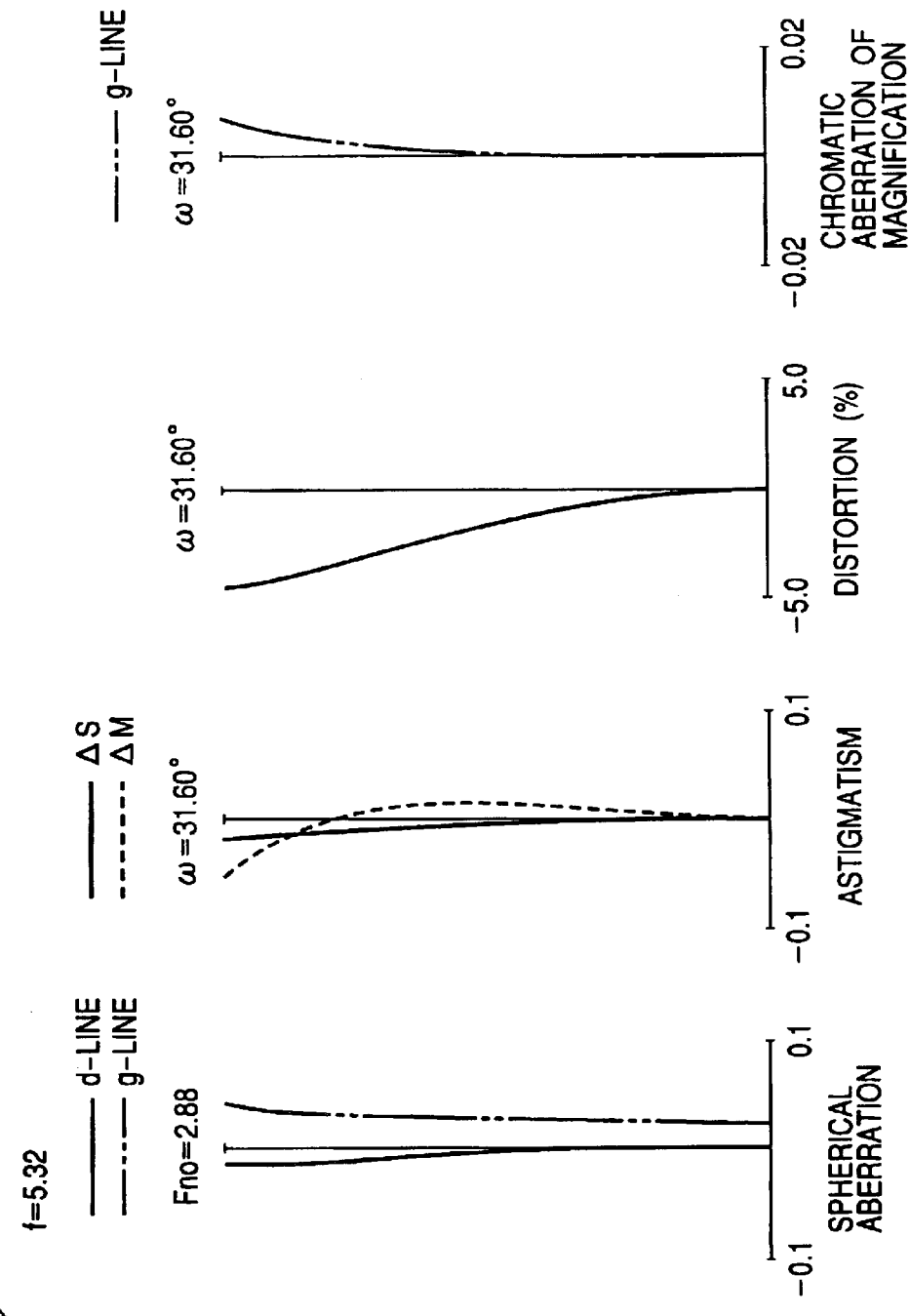
FIG. 6 is a view illustrating aberration charts of the second embodiment at its wide-angle end.
Figure 7:
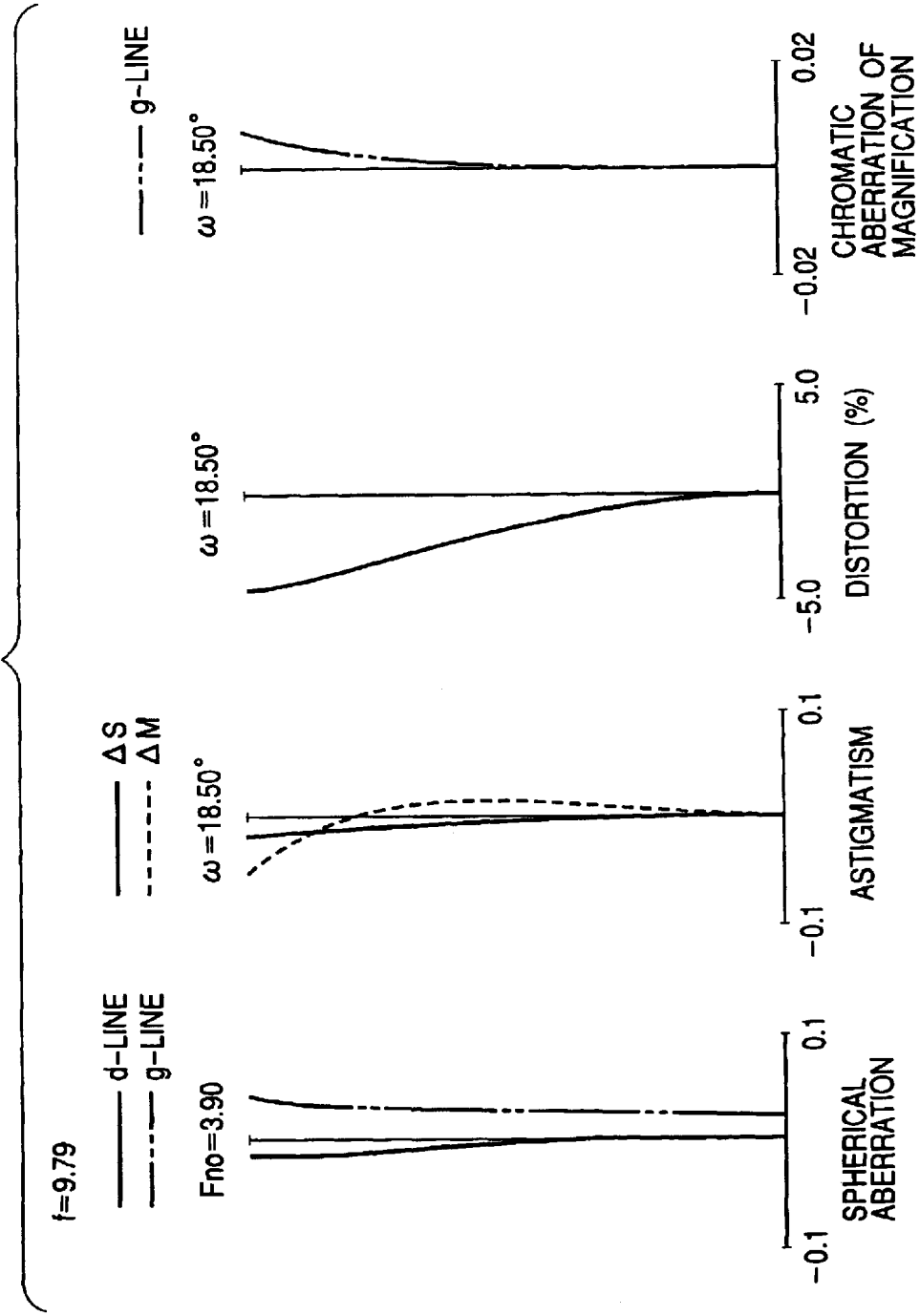
FIG. 7 is a view illustrating aberration charts of the second embodiment at its intermediate zoom point.
Figure 8:
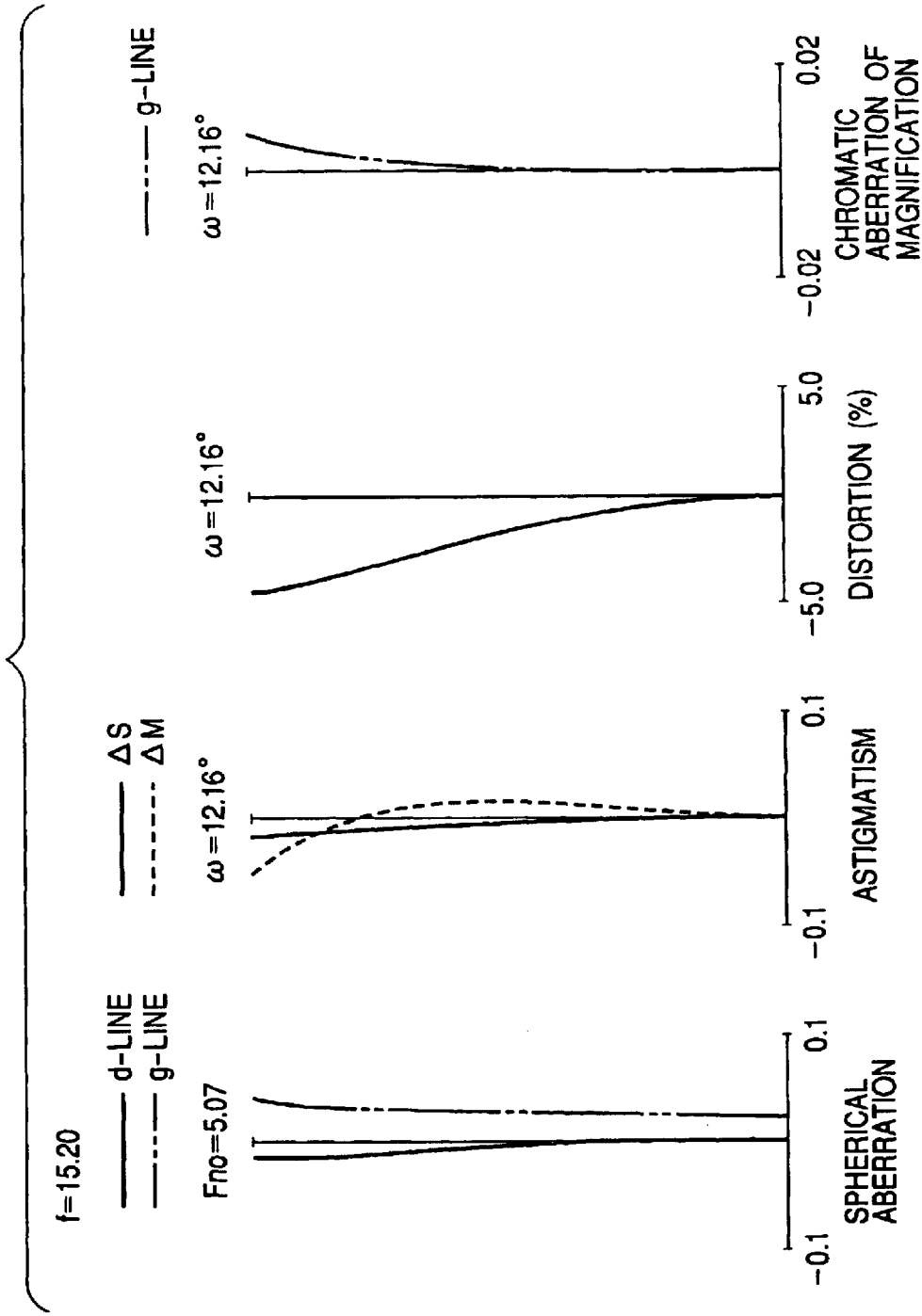
FIG. 8 is a view illustrating aberration charts of the second embodiment at its telephoto end.

FIGS. 5A to 5C are cross-sectional views illustrating a zoom lens of a second embodiment according to the present invention, and FIGS. 6 to 8 are views illustrating aberration charts of the second embodiment at its wide-angle end, at its intermediate zoom point, and at its telephoto end, respectively.

Figure 9A:
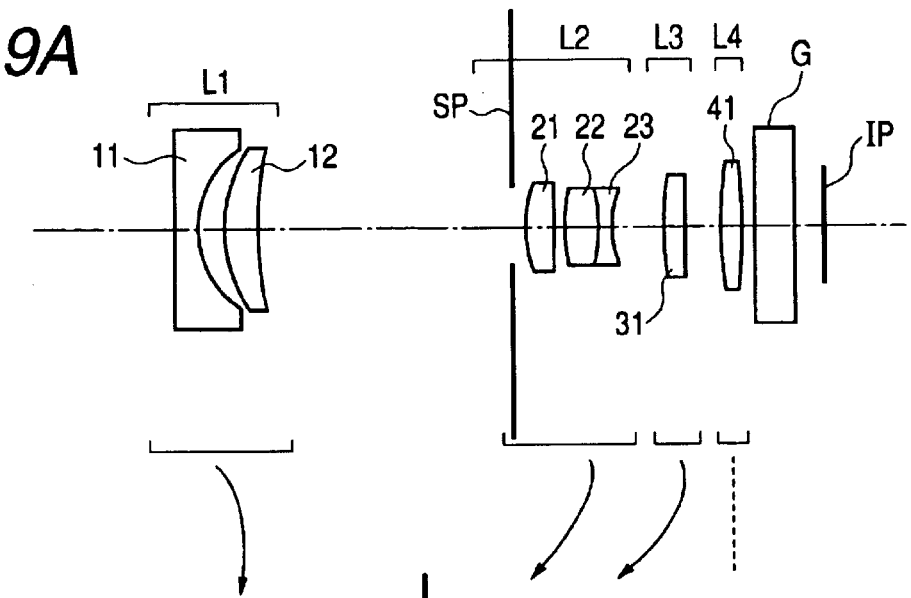
FIGS. 9A, 9B and 9C are cross-sectional views illustrating a zoom lens of a third embodiment according to the present invention.
Figure 9B:
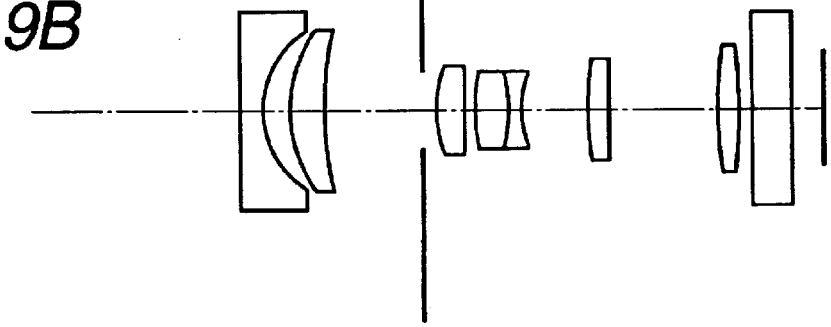
Figure 9C:
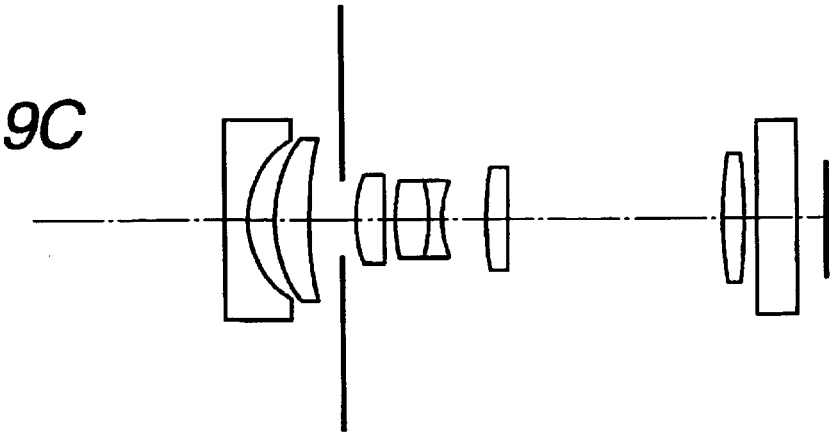
Figure 10:
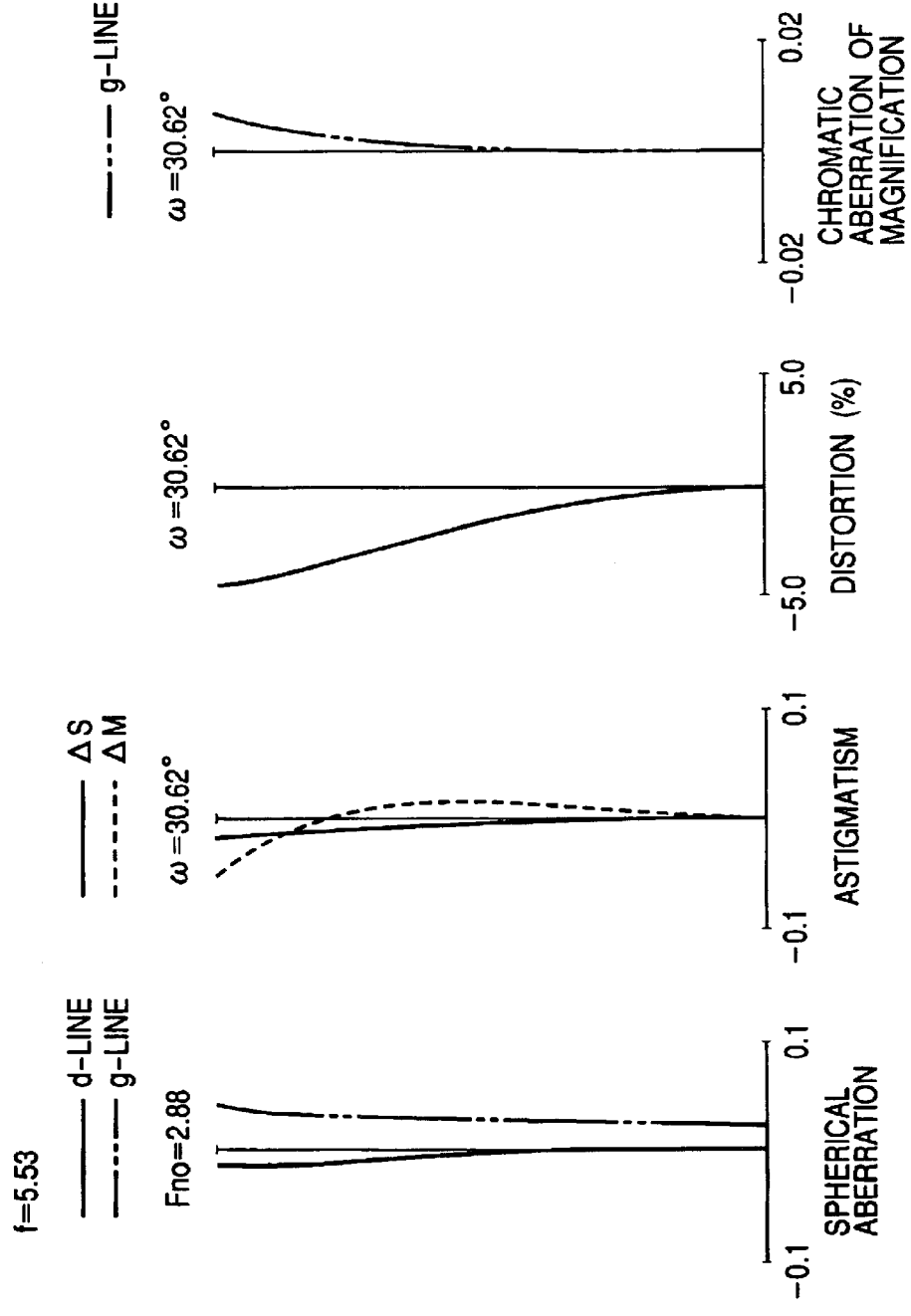
FIG. 10 is a view illustrating aberration charts of the third embodiment at its wide-angle end.

FIGS. 9A to 9C are cross-sectional views illustrating a zoom lens of a third embodiment according to the present invention, and FIGS. 10 to 12 are views illustrating aberration charts of the third embodiment at its wide-angle end, at its intermediate zoom point, and at its telephoto end, respectively.

FIGS. 1A, 5A and 9A are cross-sectional views illustrating arrangements of respective lens units at the wide-angle end, respectively, FIGS. 1B, 5B and 9B are cross-sectional views illustrating arrangements of respective lens units at the intermediate zoom point, respectively, and FIGS. 1C, 5C and 9C are cross-sectional views illustrating arrangements of respective lens units at the telephoto end, respectively.

The zoom lens discussed in each embodiment is a phototaking lens system used in an image pick-up apparatus. In each cross-sectional view of the lens, its left side is an object side (a forward side), and its right side is an image side (a rearward side). Further, L1 represents a first lens unit having negative refractive power (optical power is equal to a reciprocal of a focal length), L2 represents a second lens unit having positive refractive power, L3 represents a third lens unit having positive refractive power, and L4 represents a fourth lens unit having positive refractive power. Arrows indicate moving manners of respective lens units from the wide-angle side to the telephoto side during zooming operation. In each embodiment, the name of an i-th lens unit is used not only in the case where the lens unit is comprised of a plurality of lenses, but also in the case where the lens unit is comprised of a single lens.

Reference letters SP designate an aperture stop, and reference letters IP designate an image plane on which a photosensitive face of a solid-state pick-up device (a photoelectric transducer), such as a CCD sensor and a CMOS sensor, is located. Reference letter G designates a glass block provided corresponding to a face plate, a color filter, an optical low-pass filter, or the like in the light of designing the system.

In spherical aberrations in aberration charts of FIGS. 2 to 4, FIGS. 6 to 8, and FIGS. 10 to 12, solid line designates a d-line, alternate long and two short dashes line designates a g-line. In astigmatisms in aberration charts, solid line designates sagittal ray, and dotted line designates meridional ray. In chromatic aberrations of magnification (lateral chromatic aberration) in aberration charts, alternate long and two short dashes line designates a g-line. ω designates a half angle of view.

In each embodiment, zooming operation is executed by moving the first, second and third lens units L1, L2 and L3 such that the distance between the first lens unit L1 and the second lens unit L2 is smaller at the telephoto end than at the wide-angle end. Specifically, the first lens unit L1 moves toward the image side in a range from the wide-angle end to an approximately intermediate zoom position, and moves toward the object side in a range from the approximately intermediate zoom position to the telephoto end.

As disclosed herein, the intermediate zoom position means a position whose focal length fM is equal to fM= $(fW/fT)^{1/2}$, or its neighborhood, where fW and fT are focal lengths at the wide-angle end and the telephoto end, respectively.

In other words, the first lens unit L1 is moved along part of a locus convex toward the image side. The second and third lens units L2 and L3 are monotonously moved toward the object side. The fourth lens unit L4 does not move for zooming operation. The stop SP moves together with the second lens unit L2 during zooming operation.

In the zoom lens of each embodiment, the power is principally varied by moving the second lens unit L2 having positive refractive power, and a shift of an image point occurring during the operation of power variation is corrected by reciprocating the first lens unit L1 having negative refractive power. The third lens unit L3 having positive refractive power shares an increase in refractive power of the photo-taking lens caused by reduction of the size of the image pick-up device such that refractive power of a short zoom system comprised of first and second units can be reduced. Thereby, aberrations especially in lenses constituting the first lens unit L1 are reduced, and preferable optical performance is achieved. Further, telecentric imaging on the image side needed by a photo-taking apparatus using the solid-state image pick-up device and the like is achieved by causing the fourth lens unit L4 having positive refractive power to serve as a field lens.

As disclosed herein, the wide-angle end and the telephoto end are zoom positions of a lens unit for varying power (the second lens unit L2 in the first to third embodiments), which are opposite ends of a mechanically movable range on the optical axis, respectively.

In the zoom lens of each embodiment, locations of aspherical surfaces in the second lens unit L2 are appropriately set such that decentering between the aspherical surfaces can be readily adjusted, and correction of aberrations can be effectively achieved by the aspherical surfaces.

Specific technical advantages of each embodiment will hereinafter be described.

The first lens unit L1 includes two lenses, i.e., in order from the object side to the image side, a negative meniscus-shaped lens 11 which has an aspherical surface, and whose surface on the object side is convex, and a positive meniscus-shaped lens 12 whose surface on the object side is convex.

The second lens unit L2 includes, in order from the object side to the image side, a positive lens 21 whose opposite lens surfaces are both convex, and whose surface on the object side is aspherical, and a cemented lens formed by cementing a positive lens 22 with opposite convex lens surfaces, and s negative lens 23 with opposite concave lens surfaces and an aspherical surface on the image side.

In the positive lens 21 of the second lens unit L2, the absolute value of refractive power of the aspherical lens surface on the object side is larger than that of the opposite lens surface on the image side.

By providing two aspherical surfaces in the second lens unit L2, decentering between the aspherical surfaces can be readily adjusted, and correction of aberrations by the aspherical surfaces can be readily achieved.

The third lens unit L3 is comprised of a positive lens 31 whose surface on the object side is convex.

The fourth lens unit L4 is comprised of a positive lens 41 whose opposite lens surfaces are convex.

The following condition (1) is satisfied $$0.7 < D2al/fw < 1.1 \quad (1)$$

where D2al is an on-axis distance between the two aspherical surfaces in the second lens unit L2, and fw is a focal length of the entire system at the wide-angle end.

From another standpoint of view, the second lens unit L2 is comprised of three lens elements including two aspherical surfaces, thereby achieving preferable variation in aberrations occurring during zooming operation. Further, the following condition (1a) is satisfied $$0.7 < D2al/fw < 0.95 \quad (1a)$$

where D2al is an on-axis distance between the two aspherical surfaces in the second lens unit L2, and fw is a focal length of the entire system at the wide-angle end.

Conditions (1) and (1a) are relevant to the on-axis distance between the two aspherical surfaces in the second lens unit L2. When D2al/fw goes beyond the upper limit of the condition (1) or (1a), the size of the entire system undesirably increases.

When D2al/fw goes beyond the lower limit of the condition (1) or (1a) and the on-axis distance goes too short, it is difficult to preferably achieve simultaneous correction of spherical aberration in a telephoto range, and halo and chromatic aberration on a peripheral portion of an image plane.

More preferably, the numerical range in the condition (1) or (1a) is set as $$0.8 < D2al/fw < 0.93 \quad (1b)$$

In the second lens unit L2, aspherical surfaces are provided on convex and concave surfaces of different lenses in three lenses constituting this lens unit L2, respectively, thereby effectively achieving correction of aberrations by the aspherical surfaces.

The following condition (2) is satisfied $$17 < (\nu_{p-1} + \nu_{p-2})/2 - \nu_n < 25 \quad (2)$$

where $\nu_{p-1}$ is an Abbe number of material of the positive lens 21 on the object side constituting the second lens unit L2, $\nu_{p-2}$ is an Abbe number of material of the positive lens 22 on the image side constituting the second lens unit L2, and $\nu_n$ is an Abbe number of material of the negative lens 23 constituting the second lens unit L2.

The condition (2) is relevant to Abbe numbers of materials of lenses constituting the second lens unit L2. When $(\nu_{p-1} + \nu_{p-2})/2 - \nu_n$ goes beyond the upper or lower limit of the condition (2), it is difficult to correct variation in chromatic aberration occurring during zooming operation.

More preferably, the numerical range in the condition (2) is set as $$19 < (\nu_{p-1} + \nu_{p-2})/2 - \nu_n < 23 \quad (2a)$$

Further, a face of the second lens unit L2 closest to the image side is a concave surface containing an aspherical surface, and the following condition (3) is satisfied $$0.5 < Rnal/D2spal < 1.1 \quad (3)$$

where Rnal is a paraxial radius of curvature of this aspherical surface, and D2spal is an on-axis distance between the aperture stop SP and this concave surface.

The condition (3) is relevant to a ratio between the paraxial radius R of curvature of the concave surface containing the aspherical surface in the second lens unit L2 and the on-axis distance between the aperture stop SP and the concave surface containing the aspherical surface in the second lens unit L2. When Rnal/D2spal goes beyond the upper limit of the condition (3) and the on-axis distance between the aperture stop SP and the concave surface containing the aspherical surface in the second lens unit L2 goes too small, it is difficult to sufficiently correct coma flare on a peripheral portion of the image plane in the overall zooming range.

When Rnal/D2spal goes beyond the lower limit of the condition (3) and the on-axis distance between the aperture stop SP and the concave surface containing the aspherical surface in the second lens unit L2 goes too large, the size of the entire lens system disadvantageously increases.

More preferably, the numerical range in the condition (3) is set as $$0.7 < Rnal/D2spal < 1.0 \tag{3a}$$

As described in the foregoing, in each embodiment, a conventional zoom lens comprised of four lens units having negative, positive, positive and positive refractive powers is improved, and the lens construction and the moving method of each lens unit are set in an optimum manner. Accordingly, there can be provided a zoom lens suitably usable in digital still cameras and the like, in which a variable power ratio of about three, and bright and high optical performance are achieved while the number of lenses and the entire lens length are reduced, and a simple lens-barrel structure is achieved while the wide-angle range is contained.

Further, the lens construction of each lens unit and the moving method of each lens unit during zooming operation are set in an optimum manner, and the aspherical surface is appropriately used. Accordingly, there can be provided a zoom lens suitably usable in digital still cameras, video cameras and the like, in which a desired variable power ratio, and bright and high optical performance are achieved, and the wide-angle range is contained, while the number of lenses in the entire system and the entire lens length are reduced.

In the following, description will now be made to first to third numerical examples which correspond to numerical data of zoom lenses of the first to third embodiments, respectively. In each numerical example, i designates the order of an optical surface from the object side, Ri designates the radius of curvature of the i-th optical surface (the i-th surface), Di designates the gap or distance between the i-th surface and the (i+1)-th surface, and Ni and vi designate the index of refraction and the Abbe number of the i-th optical member for d-line, respectively. Two planar surfaces closest to the image side in each numerical example are surfaces constituting a glass block corresponding to a face plates, a filter, or the like. Further, f, Fno and ω are the focal length, the F-number, and the half angle of view, respectively.

The profile of the aspherical surface is written as $$x = (h^2/R)/\{1+[1-(1+k)(h/R)^2]^{1/2}\} + Ah^2 + Bh^4 + Ch^6 + Dh^8 + Eh^{10}$$

where k is the conical constant, A, B, C, D and E are second order, fourth order, sixth order, eighth order, and tenth order aspherical coefficients, respectively, x is a displacement along the optical axis at a location of height h from the optical axis where the surface vertex is taken as standard, and R is the radius of curvature.

In numerical values, the notation [e-0X] means [$10^{-X}$]. Table 1 lists the relationship between each of the above-discussed conditions and values in each of the numerical examples.

NUMERICAL EXAMPLE 1

| f = 5.32 to 15.20 | Fno = 2.88 to 5.06 | 2ω = 64.3 to 24.9 | |
|---|---|---|---|
| R1 = 261.000 | D1 = 1.30 | N1 = 1.802380 | v1 = 40.8 |
| *R2 = 4.511 | D2 = 1.45 | | |
| R3 = 7.970 | D3 = 2.00 | N2 = 1.846660 | v2 = 23.9 |
| R4 = 30.000 | D4 = Variable | | |
| R5 = Stop | D5 = 0.70 | | |
| *R6 = 6.020 | D6 = 1.70 | N3 = 1.740130 | v3 = 49.2 |
| R7 = −56.295 | D7 = 0.55 | | |
| R8 = 12.788 | D8 = 1.90 | N4 = 1.806098 | v4 = 40.9 |
| R9 = −10.655 | D9 = 0.70 | N5 = 1.832430 | v5 = 24.6 |
| *R10 = 4.732 | D10 = Variable | | |
| R11 = 22.423 | D11 = 1.20 | N6 = 1.696797 | v6 = 55.5 |
| R12 = 8266.268 | D12 = Variable | | |
| R13 = 24.797 | D13 = 1.20 | N7 = 1.728250 | v7 = 28.5 |
| R14 = −34.226 | D14 = Variable | | |
| R15 = ∞ | D15 = 2.30 | N8 = 1.516330 | v8 = 64.1 |
| R16 = ∞ | | | |

| Variable | Focal Length | | |
|---|---|---|---|
| Distance | 5.32 | 9.83 | 15.20 |
| D4 | 14.28 | 5.53 | 1.62 |
| D10 | 2.91 | 3.74 | 2.68 |
| D12 | 2.00 | 6.11 | 12.12 |
| D14 | 0.62 | 0.62 | 0.62 |

Aspherical Coefficients

R2: k=−8.67613e−01 A=0 B=2.50250e−04 C=1.03877e−06 D=7.73766e−08 E=−5.19641e−09

R6: k=0.00000e+00 A=0 B=−3.09633e−04 C=−9.90952e−06 D=−1.59960e−07 E=−8.23968e−09

R10: k=0.00000e+00 A=0 B=1.25335e−03 C=9.57326e−05 D=0.00000e+00 E=0.00000e+00

NUMERICAL EXAMPLE 2

| f = 5.32 to 15.20 | Fno = 2.88 to 5.07 | 2ω = 64.3 to 24.9 | |
|---|---|---|---|
| R1 = 263.503 | D1 = 1.30 | N1 = 1.802380 | v1 = 40.8 |
| *R2 = 4.549 | D2 = 1.48 | | |
| R3 = 8.071 | D3 = 2.00 | N2 = 1.846660 | v2 = 23.9 |
| R4 = 30.000 | D4 = Variable | | |
| R5 = Stop | D5 = 0.70 | | |
| *R6 = 6.017 | D6 = 1.70 | N3 = 1.740130 | v3 = 49.2 |
| R7 = −58.800 | D7 = 0.60 | | |
| R8 = 12.727 | D8 = 1.90 | N4 = 1.804000 | v4 = 46.6 |
| R9 = −12.172 | D9 = 0.70 | N5 = 1.832430 | v5 = 25.4 |
| *R10 = 4.715 | D10 = Variable | | |
| R11 = 16.537 | D11 = 1.20 | N6 = 1.516330 | v6 = 64.1 |
| R12 = 6125.345 | D12 = Variable | | |
| R13 = 24.797 | D13 = 1.20 | N7 = 1.761821 | v7 = 26.5 |
| R14 = −38.094 | D14 = Variable | | |
| R15 = ∞ | D15 = 2.30 | N8 = 1.516330 | v8 = 64.1 |
| R16 = ∞ | | | |

| Variable | Focal Length | | |
|---|---|---|---|
| Distance | 5.32 | 9.79 | 15.20 |
| D4 | 14.32 | 5.61 | 1.62 |
| D10 | 2.92 | 3.85 | 2.67 |
| D12 | 1.87 | 5.89 | 12.01 |
| D14 | 0.62 | 0.62 | 0.62 |

Aspherical Coefficients

R2: k=−8.15600e−01 A=0 B=1.71620e−04 C=6.78621e−07 D=2.35866e−08 E=−3.13292e−09

R6: k=0.00000e+00 A=0 B=−3.07465e−04 C=−1.13170e−05 D=−7.97563e−09 E=−7.86397e−09

R10: k=0.00000e+00 A=0 B=1.26242e−03 C=1.00141e−04 D=0.00000e+00 E=0.00000e+00

NUMERICAL EXAMPLE 3

| f = 5.53 to 15.81 | Fno = 2.88 to 5.10 | 2ω = 62.4 to 23.9 | |
|---|---|---|---|
| R1 = 387.456 | D1 = 1.30 | N1 = 1.802380 | ν1 = 40.8 |
| *R2 = 4.546 | D2 = 1.34 | | |
| R3 = 7.799 | D3 = 2.00 | N2 = 1.846660 | ν2 = 23.9 |
| R4 = 30.000 | D4 = Variable | | |
| R5 = Stop | D5 = 0.70 | | |
| *R6 = 6.131 | D6 = 1.70 | N3 = 1.740130 | ν3 = 49.2 |
| R7 = −41.065 | D7 = 0.54 | | |
| R8 = 13.978 | D8 = 2.04 | N4 = 1.804000 | ν4 = 46.6 |
| R9 = −7.162 | D9 = 0.70 | N5 = 1.832430 | ν5 = 27.1 |
| *R10 = 4.823 | D10 = Variable | | |
| R11 = 25.496 | D11 = 1.20 | N6 = 1.772499 | ν6 = 49.6 |
| R12 = 9164.339 | D12 = Variable | | |
| R13 = 26.209 | D13 = 1.20 | N7 = 1.805181 | ν7 = 25.4 |
| R14 = −41.698 | D14 = Variable | | |
| R15 = ∞ | D15 = 2.30 | N8 = 1.516330 | ν8 = 64.1 |
| R16 = ∞ | | | |

| Variable | Focal Length | | |
|---|---|---|---|
| Distance | 5.53 | 10.19 | 15.81 |
| D4 | 14.17 | 5.55 | 1.61 |
| D10 | 2.93 | 3.88 | 2.67 |
| D12 | 2.07 | 6.17 | 12.41 |
| D14 | 0.62 | 0.62 | 0.62 |

Aspherical Coefficients

R2: k=−1.41583e+00 A=0 B=9.76072e−04 C=−9.03089e−08 D=−6.98950e−08 E=−6.63746e−10

R6: k=0.00000e+00 A=0 B=−3.38751e−04 C=−6.68862e−06 D=−9.09232e−07 E=5.06617e−08

R10: k=0.00000e+00 A=0 B=1.14242e−03 C=8.25156e−05 D=0.00000e+00 E=0.00000e+00

TABLE 1

| | Condition | | |
|---|---|---|---|
| Numerical Embodiment | 1<br>D2al/fw | 2<br>$(\nu_{p-1} + \nu_{p-2})/2 - \nu_n$ | 3<br>Rnal/D2spal |
| 1 | 0.91 | 20.43 | 0.85 |
| 2 | 0.92 | 22.44 | 0.84 |
| 3 | 0.90 | 20.81 | 0.85 |

An embodiment directed to a digital still camera (an image pick-up apparatus) using a zoom lens in any of the first to third numerical examples will be described with reference to FIGS. 13A and 13B.

Figure 13A:
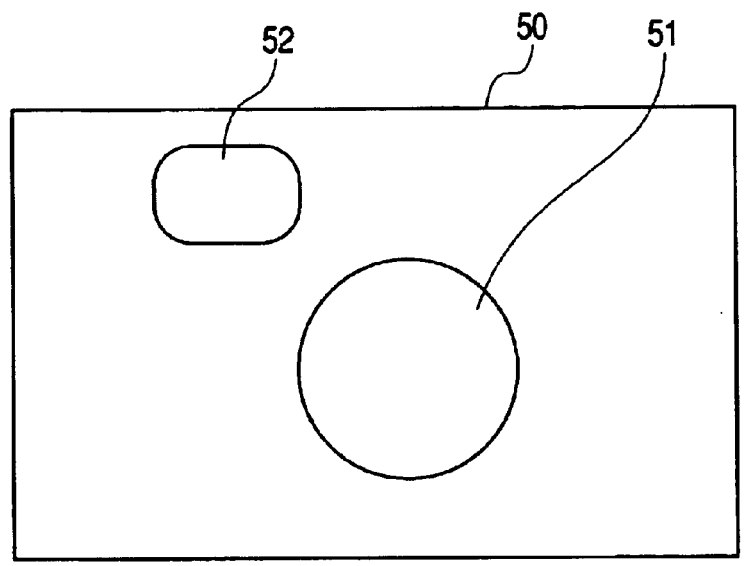
FIGS. 13A and 13B are schematic views illustrating a main portion of a digital still camera.
Figure 13B:
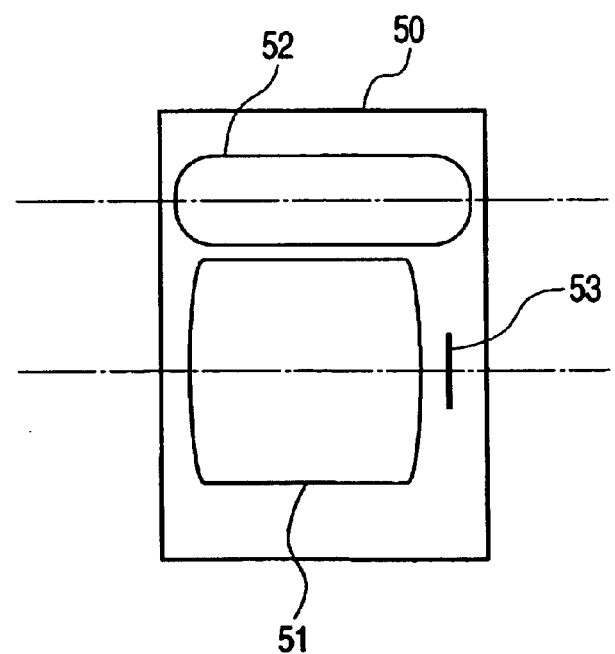

FIG. 13A is a front view of the digital still camera, and FIG. 13B is a side view of the digital still camera. In FIGS. 13A and 13B, there are shown a camera body (a camera housing) 50, a photo-taking optical system 51 using a zoom lens in any of the first to third numerical examples, a finder optical system 52, and a solid-state image pick-up device (a photoelectric transducer) 53, such as a CCD sensor, and a CMOS sensor. In the digital still camera of this embodiment, the photo-taking optical system 51 forms the image of an object on the solid-state image pick-up device 53, and the image pick-up device 53 converts the received image into electrical information. The picture image information converted into the electrical information is stored in a memory portion (not shown).

A compact photo-taking apparatus can be thus achieved by applying the zoom lens of any of the first to third numerical examples to the photo-taking optical system in a digital still camera.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A zoom lens system comprising, in order from an object side to an image side:

a first lens unit having negative optical power;

a second lens unit having positive optical power, said second lens unit consisting of, in order from the object side to the image side, a first positive lens element having an aspherical surface, and a cemented lens formed by cementing a second positive lens element and a negative lens element having an aspherical surface; and a third lens unit having positive optical power;

wherein during zooming operation of said zoom lens system, a distance between said first lens unit and said second lens unit is smaller at a telephoto end than at a wide-angle end, and a distance between said second lens unit and said third lens unit is changed, and during zooming operation of said zoom lens system from the wide-angle end to the telephoto end, said second lens unit is moved toward the object side.

2. A zoom lens system according to claim 1, wherein an absolute value of optical power of said aspherical surface of said first positive lens element in said second lens unit is larger than an absolute value of optical power of a face facing said aspherical surface of said first positive lens element.

3. A zoom lens system according to claim 1, wherein a condition of 0.7<D2al/fw<1.1 is satisfied, where D2al is an on-axis distance between said two aspherical surfaces in said second lens unit, and fw is a focal length of an entire system at the wide-angle end.

4. A zoom lens system according to claim 1, wherein a condition of $17<(\nu_{p-1}+\nu_{p-2})/2-\nu_n<25$ is satisfied, where $\nu_{p-1}$ is an Abbe number of material of said first positive lens element in said second lens unit, $\nu_{p-2}$ is an Abbe number of material of said second positive lens element in said second lens unit, and $\nu_n$ is an Abbe number of material of said negative lens element in said second lens unit.

5. A zoom lens system according to claim 1, further comprising an aperture stop, said aperture stop being moved together with said second lens unit during zooming operation, wherein said aspherical surface in said second lens unit is provided on a face of said negative lens element on the image side, and a condition of 0.5<Rnal/D2spal<1.1 is satisfied, where Rnal is a paraxial radius of curvature of said aspherical surface provided in said negative lens element, and D2spal is an on-axis distance between said aperture stop and said aspherical surface provided in said negative lens element.

6. A zoom lens system according to claim 1, further comprising a fourth lens unit having positive optical power, said fourth lens unit being disposed on the image side of said third lens unit, wherein during zooming operation from the wide-angle end to the telephoto end, said third lens unit is moved toward the object side, and said fourth lens unit does not move for zooming operation.

7. A zoom lens system according to claim 1, wherein said first lens unit includes a negative lens element disposed on a side of said first lens unit closest to the object.

8. A zoom lens system according to claim 1, wherein said first lens unit consists of a single negative lens element, and a single positive lens element in order from the object side to the image side.

9. A zoom lens system according to claim 1, wherein said zoom lens system forms an image on a photosensitive face of a solid-state pick-up device.

10. An image pick-up apparatus comprising:
   a zoom lens system recited in claim 1; and
   a solid-state pick-up device for receiving an image formed by said zoom lens system.

11. A zoom lens system comprising, in order from an object side to an image side:
   a first lens unit having negative optical power;
   a second lens unit having positive optical power, said second lens unit consisting of, in order from the object side to the image side, a first positive lens element having an aspherical surface, and a cemented lens having an aspherical surface, said cemented lens being formed by cementing a second positive lens element and a negative lens element in order from the object side to the image side; and
   a third lens unit having positive optical power;
   wherein during zooming operation of said zoom lens system, a distance between said first lens unit and said second lens unit is smaller at a telephoto end than at a wide-angle end, and a distance between said second lens unit and said third lens unit is changed; during zooming operation of said zoom lens system from the wide-angle end to the telephoto end, said second lens unit is moved toward the object side; and a condition of 0.7<D2al/fw<1.1 is satisfied, where D2al is an on-axis distance between said two aspherical surfaces in said second lens unit, and fw is a focal length of an entire system at the wide-angle end.

12. A zoom lens system according to claim 11, wherein said zoom lens system forms an image on a photosensitive face of a solid-state pick-up device.

13. An image pick-up apparatus comprising:
   a zoom lens system recited in claim 11; and
   a solid-state pick-up device for receiving an image formed by said zoom lens system.

14. A zoom lens system comprising, in order from an object side to an image side:
   a first lens unit having negative optical power;
   a second lens unit having positive optical power, said second lens unit consisting of three lens elements in order from the object side to the image side of a first positive lens element, a second positive lens element and a negative lens element having at least two aspherical surfaces; and
   a third lens unit having positive optical power;
   wherein during zooming operation of said zoom lens system, a distance between said first lens unit and said second lens unit is smaller at a telephoto end than at a wide-angle end, and a distance between said second lens unit and said third lens unit is changed; during zooming operation of said zoom lens system from the wide-angle end to the telephoto end, said second lens unit is moved toward the object side; and a condition of 0.7<D2al/fw<0.95 is satisfied, where D2al is an on-axis distance between said two aspherical surfaces in said second lens unit, and fw is a focal length of an entire system at the wide-angle end.

15. A zoom lens system according to claim 14, wherein said zoom lens system forms an image on a photosensitive face of a solid-state pick-up device.

16. An image pick-up apparatus comprising:
   a zoom lens system recited in claim 14, and
   a solid-state pick-up device for receiving an image formed by said zoom lens system.

17. A zoom lens system comprising, in order from an object side to an image side:
   a first lens unit having negative optical power and consisting of two lens elements;
   a second lens unit having positive optical power, said second lens unit consisting of three lens elements, and two aspherical surfaces being provided on a convex face and a concave face of two different lens elements in said three lens elements, respectively; and
   a third lens unit having positive optical power;
   wherein during zooming operation of said zoom lens system, a distance between said first lens unit and said second lens unit is smaller at a telephoto end than at a wide-angle end, and a distance between said second lens unit and said third lens unit is changed; and during zooming operation of said zoom lens system from the wide-angle end to the telephoto end, said second lens unit is moved toward the object side.

18. A zoom lens system according to claim 17, wherein said aspherical surface provided on said convex face is disposed on a side closest to the object in said second lens unit, and said aspherical surface provided on said concave face is disposed on a side closest to the image in said second lens unit.

19. A zoom lens system according to claim 17, wherein said zoom lens system forms an image on a photosensitive face of a solid-state pick-up device.

20. An image pick-up apparatus comprising:
   a zoom lens system recited in claim 17; and
   a solid-state pick-up device for receiving an image formed by said zoom lens system.

* * * * *